(12) United States Patent
Ramesh

(10) Patent No.: US 9,993,881 B2
(45) Date of Patent: Jun. 12, 2018

(54) IDEXABLE DRILL INSERT

(71) Applicant: KENNAMETAL INDIA LIMITED, Bangalore (IN)

(72) Inventor: Karthic Ramesh, Bangalore (IN)

(73) Assignee: KENNAMETAL INDIA LIMITED, Bangalore (IN)

( * ) Notice: Subject to any disclaimer, the term of this patent is extended or adjusted under 35 U.S.C. 154(b) by 157 days.

(21) Appl. No.: 13/903,295

(22) Filed: May 28, 2013

(65) Prior Publication Data

US 2013/0315684 A1 Nov. 28, 2013

(30) Foreign Application Priority Data

May 28, 2012 (IN) .............................. 2114/CHE/2012

(51) Int. Cl.
 *B23B 51/02* (2006.01)
 *B23B 51/04* (2006.01)
 *B23B 27/14* (2006.01)

(52) U.S. Cl.
 CPC .......... *B23B 51/048* (2013.01); *B23B 27/141* (2013.01); *B23B 27/145* (2013.01); *B23B 2200/0471* (2013.01); *B23B 2200/125* (2013.01); *B23B 2200/204* (2013.01); *Y10T 407/23* (2015.01); *Y10T 408/9098* (2015.01)

(58) Field of Classification Search
 CPC ................ B23B 51/048; B23B 27/141; B23B 2200/0471; B23B 2200/125; B23B 2200/204; Y10T 407/23; Y10T 408/9098
 USPC .......................................... 407/113; 408/231
 See application file for complete search history.

(56) References Cited

U.S. PATENT DOCUMENTS

| | | | |
|---|---|---|---|
| 3,497,933 | A | 3/1970 | Okada |
| 4,072,438 | A | 2/1978 | Powers |
| 4,087,917 | A | 5/1978 | Sheerer |
| 4,115,024 | A | 9/1978 | Sussmuth |

(Continued)

FOREIGN PATENT DOCUMENTS

| | | |
|---|---|---|
| CN | 1251327 A | 4/2000 |
| CN | 1110051 C | 5/2003 |

(Continued)

OTHER PUBLICATIONS

USPTO, "First Office Action for U.S. Appl. No. 13/552,964", dated Jan. 13, 2015, 29 pp.

(Continued)

*Primary Examiner* — Daniel Howell
*Assistant Examiner* — Paul M Janeski
(74) *Attorney, Agent, or Firm* — Larry R. Meenan

(57) ABSTRACT

The present disclosure relates to a quadrangular indexable drill insert. The drill insert includes a substantially flat top surface, a bottom surface and a side surface adjoining the top and bottom surfaces. The side surface comprises four identical cutting edges intersecting the top surface; each cutting edge comprises a first part edge oriented inwardly towards axis of the drill body. A second part edge tangential to an imaginary inscribed circle diameter connected to the first part edge through a convex curve. A third part connected to the second part edge through concave curve and a fourth part edge connected to the third part edge though a convex curve. The insert further includes a curved nose portion at four corners, each adjoining a first part edge of one cutting edge with a fourth part edge of a succeeding cutting edge.

12 Claims, 6 Drawing Sheets

(56) References Cited

U.S. PATENT DOCUMENTS

| | | |
|---|---|---|
| 4,131,383 A | 12/1978 | Powers |
| 4,189,265 A | 2/1980 | Arnold et al. |
| 4,194,862 A | 3/1980 | Zweekly |
| 4,475,851 A | 10/1984 | Hale |
| 4,507,024 A | 3/1985 | Stashko |
| 4,606,679 A | 8/1986 | Jeremias |
| 4,648,760 A | 3/1987 | Karlsson et al. |
| 4,859,123 A | 8/1989 | Koesashi |
| 4,889,455 A | 12/1989 | Karlsson et al. |
| 4,915,548 A | 4/1990 | Fouquer et al. |
| 4,966,500 A | 10/1990 | Tsujimura et al. |
| 4,990,036 A | 2/1991 | Eklund |
| 5,032,049 A | 7/1991 | Hessman et al. |
| 5,158,402 A | 10/1992 | Satran et al. |
| 5,221,164 A | 6/1993 | Allaire |
| 5,232,319 A | 8/1993 | Satran et al. |
| 5,302,060 A | 4/1994 | Nystrom et al. |
| 5,340,246 A | 8/1994 | Tukala |
| 5,437,522 A | 8/1995 | Satran et al. |
| 5,486,073 A | 1/1996 | Satran et al. |
| 5,509,761 A | 4/1996 | Grossman et al. |
| 5,593,255 A | 1/1997 | Satran et al. |
| 5,597,271 A | 1/1997 | Men et al. |
| 5,709,509 A | 1/1998 | Wegener et al. |
| 5,720,583 A | 2/1998 | Bohnet et al. |
| 5,727,919 A | 3/1998 | Heumann et al. |
| 5,807,031 A | 9/1998 | Arai et al. |
| 5,895,179 A | 4/1999 | Gschwend et al. |
| 5,947,650 A | 9/1999 | Satran et al. |
| 5,957,635 A | 9/1999 | Nuzzi et al. |
| 5,971,672 A | 10/1999 | Hansson |
| 5,975,812 A | 11/1999 | Friedman |
| 6,019,553 A | 2/2000 | Yakamavich, Jr. |
| 6,039,515 A | 3/2000 | Lamberg |
| 6,200,077 B1 | 3/2001 | Svenningsson et al. |
| 6,224,300 B1 | 5/2001 | Baxivanelis et al. |
| 6,257,807 B1 | 7/2001 | Heinloth |
| 6,336,776 B1 | 1/2002 | Noggle |
| 6,527,486 B2 | 3/2003 | Wiman et al. |
| 6,543,970 B1 | 4/2003 | Qvarth et al. |
| 6,712,563 B2 | 3/2004 | Maier |
| 6,733,212 B2 | 5/2004 | Nagaya et al. |
| 6,783,306 B2 | 8/2004 | Popke |
| 6,929,432 B2 | 8/2005 | Roman et al. |
| 6,948,891 B2 | 9/2005 | Roman |
| 7,121,772 B2 | 10/2006 | Krahula et al. |
| 7,175,370 B2 | 2/2007 | Scherbarth |
| 7,192,224 B2 | 3/2007 | Fritsch et al. |
| 7,341,408 B2 | 3/2008 | Kratz |
| 7,351,017 B2 | 4/2008 | Kruszynski et al. |
| 7,374,372 B2 | 5/2008 | Rofner et al. |
| 7,431,540 B2 | 10/2008 | Lof et al. |
| 7,438,508 B2 | 10/2008 | Alm et al. |
| 7,513,717 B2 | 4/2009 | Engstrom et al. |
| 7,677,845 B2 | 3/2010 | Limell et al. |
| 7,695,221 B2 | 4/2010 | Kruszynski et al. |
| 7,758,287 B2 | 7/2010 | Alm et al. |
| 7,837,417 B2 | 11/2010 | Blomstedt |
| 7,857,555 B2 | 12/2010 | Wermeister |
| 7,905,687 B2 | 3/2011 | Dufour et al. |
| 7,909,546 B2 | 3/2011 | Nada et al. |
| 7,922,427 B2 | 4/2011 | Spitzenberger et al. |
| 7,972,091 B2 | 7/2011 | Svenningsson et al. |
| 8,157,489 B2 | 4/2012 | Wolf et al. |
| 8,192,113 B2 | 6/2012 | Limell et al. |
| 8,197,163 B2 | 6/2012 | Nasu et al. |
| 2002/0061235 A1 | 5/2002 | Maier |
| 2003/0223832 A1 | 12/2003 | Roman et al. |
| 2003/0223833 A1 | 12/2003 | Roman |
| 2005/0111928 A1 | 5/2005 | Stanarius et al. |
| 2007/0160433 A1 | 7/2007 | Lee et al. |
| 2007/0201962 A1 | 8/2007 | Limell |
| 2008/0131217 A1 | 6/2008 | Kruszynski et al. |
| 2008/0226403 A1 | 9/2008 | Craig |
| 2009/0071723 A1 | 3/2009 | Mergenthaler et al. |
| 2009/0238649 A1 | 9/2009 | Kruszynski et al. |
| 2009/0245949 A1 | 10/2009 | Takahashi et al. |
| 2010/0129167 A1 | 5/2010 | Morrison |
| 2010/0178122 A1 | 7/2010 | Bae |
| 2010/0209203 A1 | 8/2010 | Cao |
| 2010/0272526 A1 | 10/2010 | Dufour |
| 2010/0329804 A1 | 12/2010 | Okumura |
| 2012/0027530 A1 | 2/2012 | Agic |
| 2013/0022422 A1 | 1/2013 | Ramesh |
| 2013/0022423 A1 | 1/2013 | Ramesh |
| 2013/0315684 A1 | 11/2013 | Ramesh |
| 2014/0161552 A1 | 6/2014 | Ramesh |
| 2014/0212235 A1 | 7/2014 | Prast et al. |

FOREIGN PATENT DOCUMENTS

| | | |
|---|---|---|
| CN | 1655899 A | 8/2005 |
| CN | 1655900 A | 8/2005 |
| CN | 1671499 A | 9/2005 |
| CN | 1251327 C | 4/2006 |
| CN | 100571943 C | 12/2009 |
| CN | 101720265 A | 6/2010 |
| CN | 101234432 B | 11/2011 |
| CN | 101668604 B | 2/2012 |
| CN | 101720265 B | 2/2012 |
| CN | 102361719 A | 2/2012 |
| CN | 101437640 B | 3/2012 |
| CN | 102458739 A | 5/2012 |
| CN | 101152671 B | 5/2013 |
| DE | 102006044605 A1 | 3/2008 |
| EP | 1813368 A2 | 8/2007 |
| EP | 1902799 A2 | 3/2008 |
| JP | 59196107 A | 11/1984 |
| JP | 60109806 | 7/1985 |
| JP | 1018519 A | 7/1998 |
| JP | 2000061719 A | 2/2000 |
| JP | 2002066811 A | 3/2002 |
| JP | 2003094222 A | 4/2003 |
| JP | 2005527390 | 9/2005 |
| JP | 2005525175 A | 10/2005 |
| JP | 2007203454 A | 8/2007 |
| JP | 2008183703 A | 8/2008 |
| JP | 2008207283 A | 9/2008 |
| JP | 2009262277 A | 11/2009 |
| JP | 2009262319 A | 11/2009 |
| JP | 2010528890 A | 8/2010 |
| JP | 4627849 | 2/2011 |
| JP | 2012143866 A | 8/2012 |
| WO | 93/13899 A1 | 7/1993 |
| WO | 03/099494 A1 | 12/2003 |
| WO | 03/099495 A1 | 12/2003 |
| WO | 03099495 | 12/2003 |
| WO | 2008/153233 A1 | 12/2008 |
| WO | 2010126693 A1 | 11/2010 |
| WO | WO2011111197 A1 | 9/2011 |
| WO | 2013016018 A2 | 1/2013 |
| WO | 2014116571 | 7/2014 |

OTHER PUBLICATIONS

Corresponding matter office action of Sep. 26, 2013].
Dec. 11, 2014—Non-Final_Rejection.
JP_2000061719_A_translation, obtained at http://dossier2.ipdl.inpit.go.jp/JP/application/P/1999-229114/13.08.1999_Description_59900785880.htm.
PCT Search Report; PCT/US2012/046576.
PCT/US2014/012282: International Search Report and Written Opinion mailed Apr. 28, 2014.
European Patent Office, "extended European search report for application No. EP 12 81 7536", dated Feb. 13, 2015, 6 pp.
Apr. 1, 2015 Final Office Action US 2013-0022423 A1.
Jun. 8, 2015 Final Office Action 20130022422.
Jul. 22, 2015 First office action 103702789.
Advisory Action—Sep. 2, 2015.
Feb. 13, 2015—European Search Report.
Sep. 25, 2015 First office action.
Sep. 29, 2015 First office action.

(56) References Cited

OTHER PUBLICATIONS

Oct. 30, 2015 First office action.
Feb. 23, 2016 Notice of Allowance.
Mar. 30, 2016 Second Office Action.
Apr. 26, 2016 First office action.
May 11, 2016 Second Office Action.
May 24, 2016 Second Office Action.
Jun. 1, 2016 Second Office Action.
Jul. 12, 2016—First Office Action.
Sep. 1, 2016—Third Office Action.
Oct. 20, 2016 Third Office Action.
Nov. 7, 2016 Final Office Action.
Dec. 2, 2016 Third Office Action.

IDEXABLE DRILL INSERT

CROSS-REFERENCE TO RELATED APPLICATIONS

This application claims priority from Indian Application Number 2114/CHE/2012 filed May 28, 2012.

FIELD OF THE INVENTION

Embodiments of the present disclosure relate to a drill insert, more particularly embodiments relate to a quadrangular indexable drill insert for peripheral pocket of the drill body.

BACKGROUND INFORMATION

Drilling tools are used to drill cylindrical holes in metallic workpieces. The cutting or boring action of the drill tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the workpiece may be made to rotate relative to the holder and cutting insert, such as in positioning the holder in the tail stock of a lathe or the like. Further, tool and workpiece can be made to rotate relative to one another. The use of cutting inserts allows for quick changing of the insert upon wear of the cutting surfaces instead of the entire tool, and allows for one tool to be used for a variety of different boring applications by simply changing the insert and not the entire drill assembly.

The indexable drill inserts plays a very important role in drilling because all the sides of insert can be used for cutting one after the other. Further, use of inserts reduces the manufacturing lead time and assembling time.

The use of quadrangular indexable drill inserts is known in the art. However, the inserts which are in the art comprises four rectangular cutting edges for cutting the workpiece. The use of rectangular cutting edges make the drill tend to drift away from its center because the cutting forces act all over the drill body and not exactly at the center. The drill drift further creates a narrow wall which is not feasible in practical applications. Further, conventional indexable drill inserts rub the surface of the drilling hole if the diameter of the drill hole is less than the predetermined value.

Recently, many techniques have been introduced by various drill insert manufactures to balance the cutting forces in the drill body to prevent a drill from drifting from the center. One such technique is to divide the cutting edge into a plurality of part edges. The part edges are oriented in a predetermined pattern to balance the cutting forces. In the conventional drill inserts the part edges are joined by a transition edge comprising a convex curve and a concave curve. The chip formation in the conventional cutting inserts is unsmooth since there is a sudden change over from the concave portion to the convex portion, which results in a high stress area. Also, the chips may sometimes split themselves into smaller fragments, which instead of getting into the flute of the drill tool, go around the drill tool, thereby ruining the surface finish of the hole produced.

In light of the foregoing discussion, it is necessary to develop a drill insert to overcome the limitations of the prior art stated in the above background.

SUMMARY OF THE INVENTION

Shortcomings of the prior art are overcome and additional advantages are provided through the provision of a drill insert as described in the present disclosure.

Additional features and advantages are realized through the techniques of the present disclosure. Other embodiments and aspects of the disclosure are described in detail herein and are considered a part of the claimed disclosure.

The present disclosure provides a quadrangular indexable drill insert comprising: a substantially flat top surface and bottom surface, a side surface adjoining the top and bottom surfaces from four sides of the drill insert, the bottom surface being smaller than the top surface to provide positive cutting geometry. Four identical cutting edges of the side surface intersect the top surface, each cutting edge comprising: a first part edge oriented inwardly towards the axis of the drill body; a second part edge extends from the first part edge and is tangential to an imaginary inscribed circle about the insert axis; a third part edge extends away from the center axis of the drill insert and is joined to the second part edge by a concave curve, and a fourth part edge extends away from the center axis of the drill insert and is joined to the third part edge by a convex curve. The drill insert further comprises four curved nose portions, each having a predetermined radius and disposed at each of the four corners of the insert. Each curved nose portion adjoins the first part edge of one cutting edge with the fourth part edge of a succeeding cutting edge. The drill insert also includes a through hole at the center of the drill insert which extends between the top surface and the bottom surface of the drill insert for mounting the insert with the drill body; and a chamfer provided at the bottom edge of the drill insert.

In one embodiment of the present disclosure, the drill insert is mounted at a peripheral pocket of the drill body.

In one embodiment of the present disclosure, the part edges are linear, and the first part edge, second part edge, third part edge and fourth part edge are inclined at an angle in the range of from about 0.5° to about 5°, about 5° to about 15°, about 20° to about 50° and 0° respectively with respect to a horizontal axis of the insert.

In one embodiment of the present disclosure, each of the curved nose portions have a radius in the range of from about 0.4 mm to about 1.2 mm.

In one embodiment of the present disclosure, the through hole comprises a mouth portion and a series of stepped portions for accommodating an insert screw.

In one embodiment of the present disclosure, the angle of the chamfer depends on the thickness of the drill insert and is preferably about 30° with respect to a vertical axis of the drill insert.

In one embodiment of the present disclosure, the top surface is provided with a protruded portion around the mouth portion.

In one embodiment of the present disclosure, corners of the edge surface of the insert make an angle in the range of from about 0° to about 11° with respect to a vertical axis of the drill insert to facilitate clearance between the insert and the pocket.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

Novel features and characteristics of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

The figures depict embodiments of the disclosure for purposes of illustration only. One skilled in the art will readily recognize from the following description that alternative embodiments of the structures and methods illustrated herein may be employed without departing from the principles of the disclosure described herein.

DESCRIPTION OF THE PREFERRED EMBODIMENTS

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In order to overcome the drawbacks mentioned in the background, a quadrangular indexable drill insert has been developed. An example drill insert of the present disclosure consists of four identical cutting edges having plurality of part edges which direct the forces to the center of the drill body, which helps to prevent drifting of the drill body from its center during drilling operations.

Figure 1:
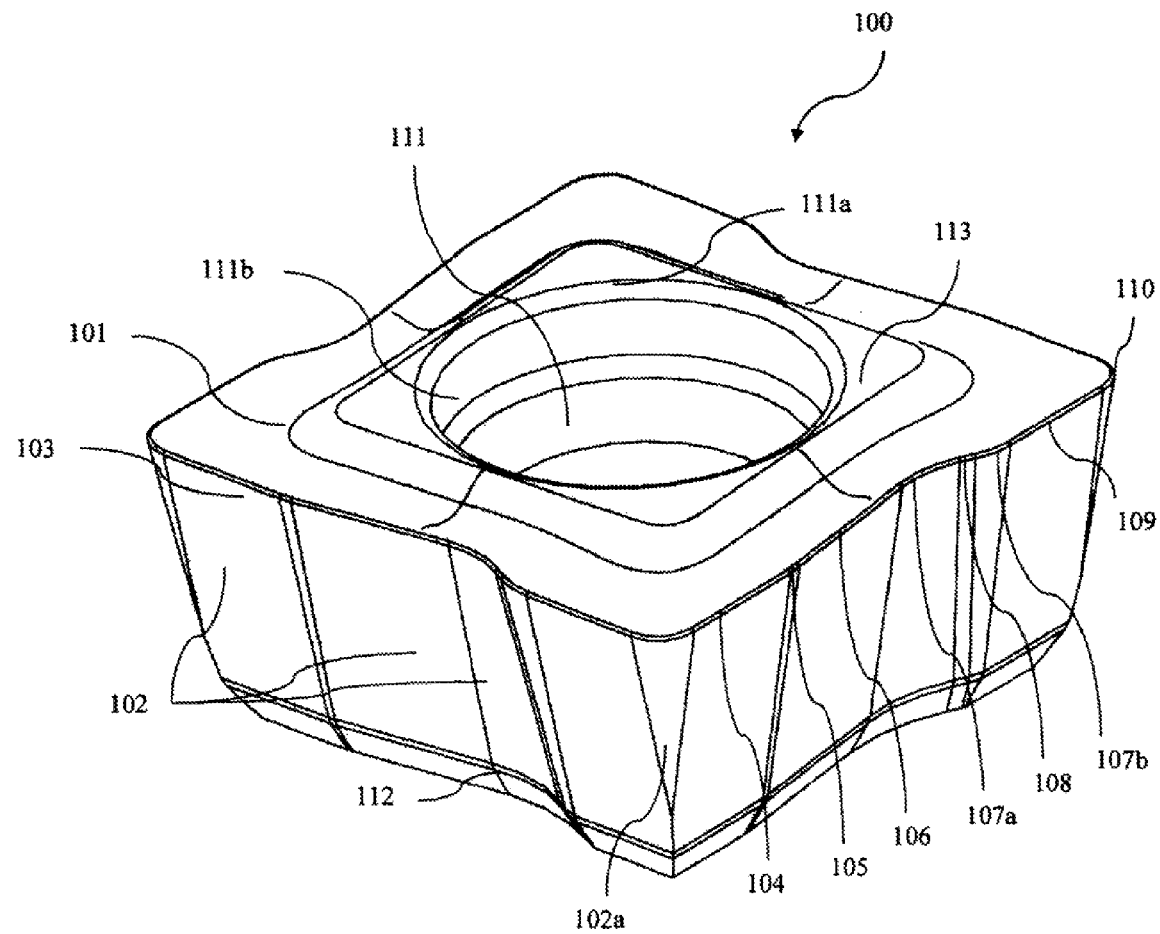
FIG. 1 illustrates a top perspective view of an example drill insert in accordance with the present disclosure.
Figure 2:
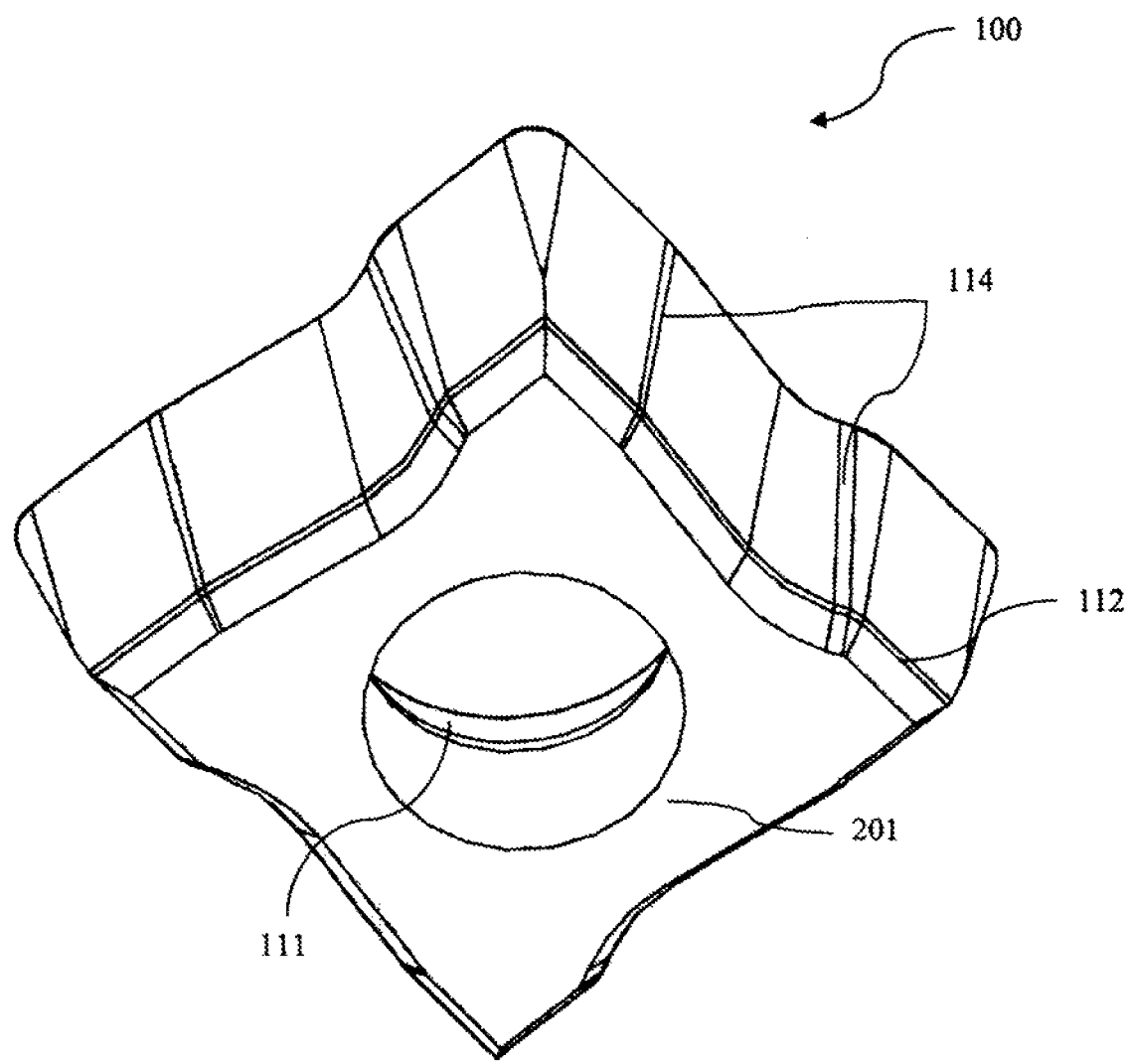
FIG. 2 illustrates a bottom perspective view of the drill insert of FIG. 1.
Figure 3:
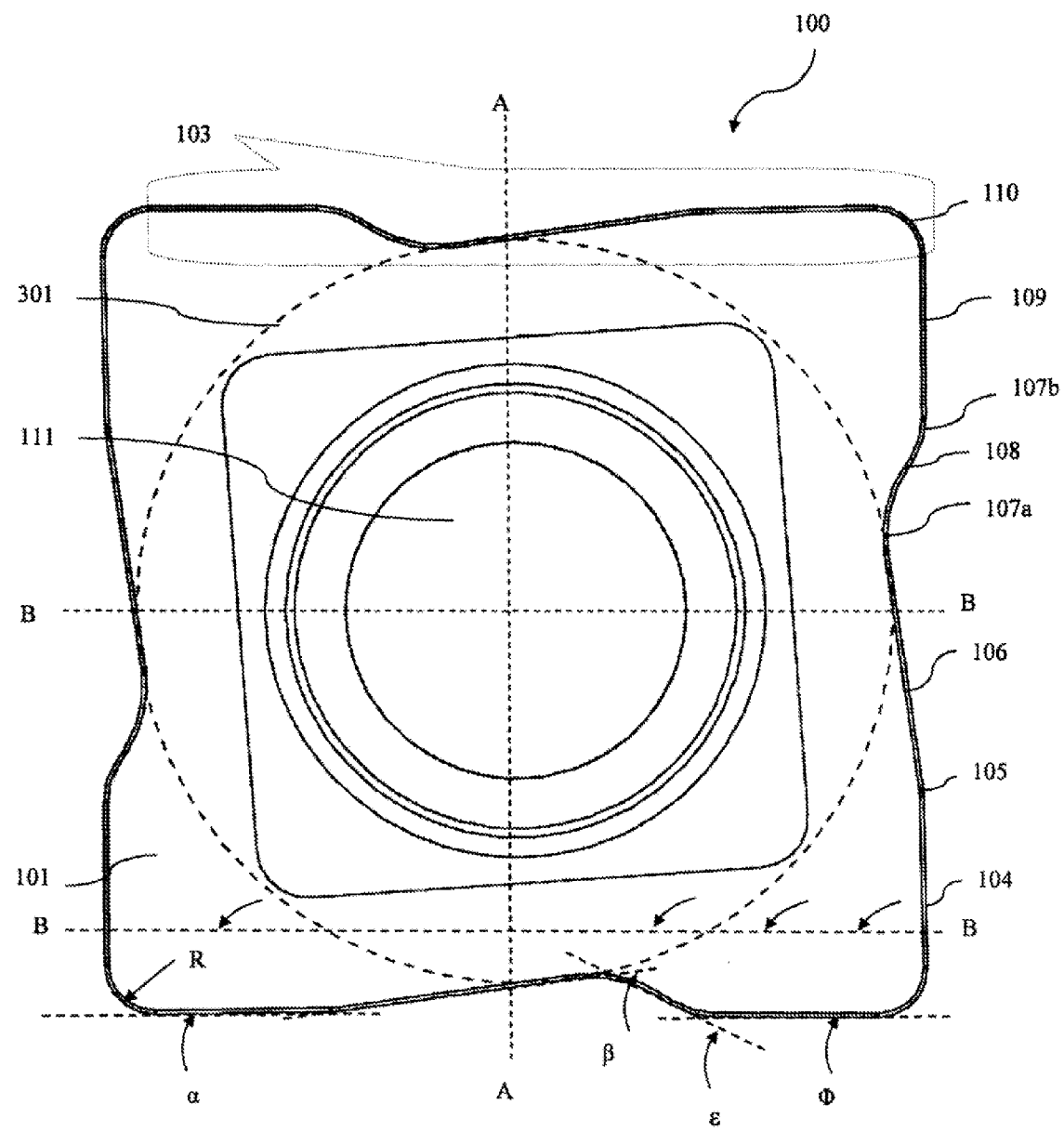
FIG. 3 illustrates a top view of the drill insert of FIG. 1.
Figure 5:
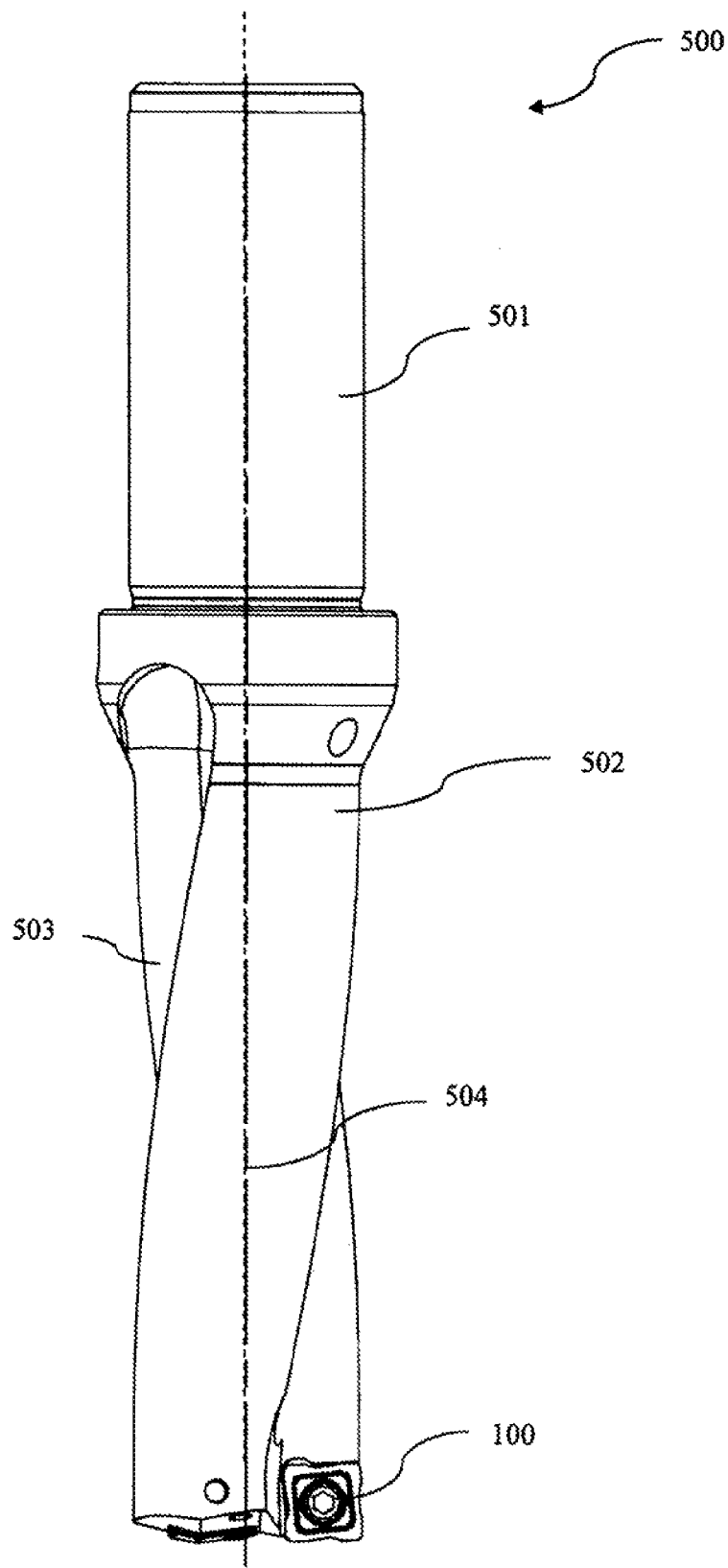
FIG. 5 illustrates a drill tool in accordance with the present disclosure including a drill body having the drill insert of FIG. 1 disposed in a peripheral pocket and a conventional insert in a center pocket.
Figure 6:
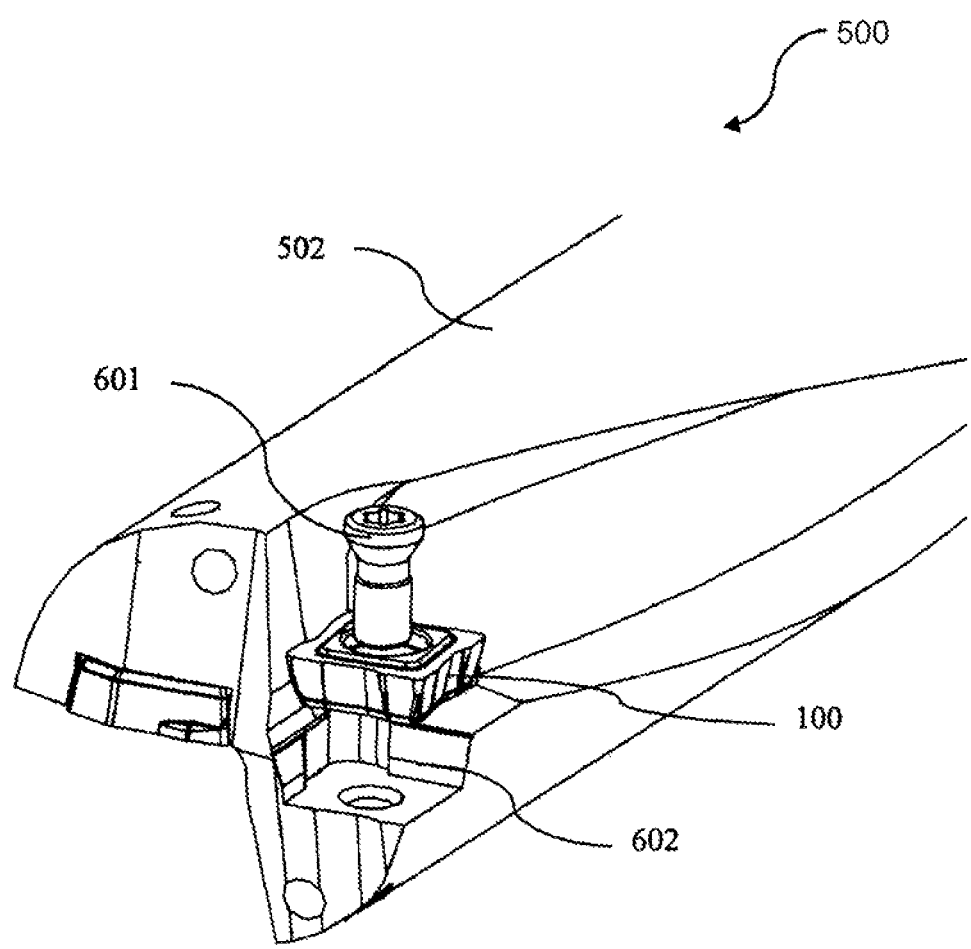
FIG. 6 illustrates a partially exploded isometric end view of drill tool of FIG. 5 having the drill insert of FIG. 1 in the peripheral pocket of the drill body.

FIGS. 1-4 illustrate views of an exemplary embodiment of an example drill insert (100) in accordance with the present disclosure. FIGS. 5 and 6 illustrate views of an exemplary drill body (502) in accordance with the present disclosure having the example drill insert (100). The drill insert (100) comprises a top surface (101) and a bottom surface (201) and side surfaces (102) adjoining the top and bottom surfaces (101 and 201). The top surface (101) of the drill insert (101) is bigger than the bottom surface (201) to provide positive clearance between the drill insert (100) and a pocket (602) (FIG. 6) in a drill body (502) (FIGS. 5 and 6). As shown in FIGS. 1 and 3, the edges (103) of the top surface (101) are divided into plurality of part edges (104, 106, 108 and 109) to direct the forces to the drilling axis (504) and thereby to prevent drifting of the drill body (502) from its center.

Continuing to refer to FIGS. 1 and 3, the first part edge (104) of each cutting edge (103) is oriented inwardly towards the central axis of the drill insert (100) and forms an angle ($\alpha$) generally in the range of about 0.5° to about 1.5° with respect to the axis (B-B) (with respect to the orientation shown in FIG. 3) of the drill insert (100). In an exemplary embodiment, the angle ($\alpha$) of the first part edge (104) is 1° with respect to the axis (B-B) of the drill insert (100). The second part edge (106) is connected to the adjacent one of the first part edges (104) through a convex curve (105). The second part edge (106) generally forms an angle ($\beta$) in the range of from about 5° to about 15° with respect to the axis (B-B) of the drill insert (100). In an exemplary embodiment, the angle ($\beta$) of the second part edge (106) is 6° with respect to the axis (B-B) of the drill insert (100). The second part edge (106) is tangential to an inscribed circle (301) of the drill insert (100). The third part edge (108) is connected to the second part edge (106) via a concave curve (107a). The third part edge (108) is linear and extends generally away from the center of the drill insert (100), and forms an angle ($\epsilon$) in the range of about 20° to about 50° with respect to axis (B-B) of the drill insert (100). In an exemplary embodiment, the angle ($\epsilon$) of the third part edge (108) is 34° with respect to axis (B-B) of the drill insert (100). The fourth part edge (109) is connected to the third part edge (108) though a convex curve (107b). The fourth part edge (109) is linear and extends generally away from the center of the drill insert (100), and forms an angle of 0° and thus is parallel with respect to axis (B-B) of the drill insert (100). Further, a corner (110) of the cutting edge (103) has a corner radius (R) and, each corner (110) of a respective cutting edge (103) connects the fourth part edge (109) of the one edge (103) to the first part edge (104) of a subsequent cutting edge (103). The corner radius (R) of each corner (110) depends on the thickness of the insert (100) and a diameter of the inscribed circle (301). The corner radius (R) is generally in the range of from about 0.4 mm to about 1.2 mm.

The provision of the third part edge (108) between the concave curve (107a) and the convex curve (107b) of the drill insert (100) enables better and smoother chip formation. Hence, this prevents chips from splitting into fragments. Therefore, only one complete chip is formed over the entire cutting edge (103) and evacuation through a flute (503) (FIG. 5) is achieved.

In one embodiment of the present disclosure, the first part edges (104) and second part edges (106) are oriented inwardly towards the inscribed circle (301) at an angle ($\alpha$ and β) respectively with slope being positive, i.e., the first and second part edges are elevated from the axis (B-B) of the drill insert (100).

The drill insert (100) further includes a hole (111) extending from top surface (101) to the bottom surface (201) of the drill insert (100) for mounting the insert (100) with the drill body (502) (FIG. 5). Referring to FIG. 1, a mouth portion (111a) is provided around the hole (111) on the top surface (101) and a series of stepped portions (111b) are provided on the circumference of the hole (111) to accommodate the insert screw (601) (FIG. 6) for mounting the drill insert (100) in the pocket (602) of the drill body (502), such as shown in FIG. 5.

In one embodiment of the present disclosure, a protruded portion (113) (FIGS. 1 and 4) is provided on the top surface (101) of the drill insert (100). Said protruded portion (113) facilitates cutting/fragmenting of the chip resulting from the drilling operation and directs the chip to the helical flute portion (503) of the drill body (502) to facilitate chip vacation.

The side surfaces (102) of the drill insert (100) include a plurality of protruded portions (114) (FIG. 2) to secure the drill insert (100) inside the pocket (602) of the drill body (502). The protruded portions (114) make contact with the walls of the pocket (602) and arrest the rotational motion of the drill insert (100) inside the pocket (602). Further, referring to FIG. 4, corners (102a) of the side surface (102) make an angle (ψ) ranging from about 0° to about 15° with respect to vertical axis (A-A) of the drill insert (100) to facilitate clearance between the insert (100) and the pocket (602). In an aspect of the present disclosure, the angle (ψ) of the corners is 11° with respect to vertical axis (A-A) of the drill insert (100). This clearance is a primary clearance which helps to remove the insert (100) easily from the pocket (602) of the drill body (500) (FIG. 5).

Figure 4:
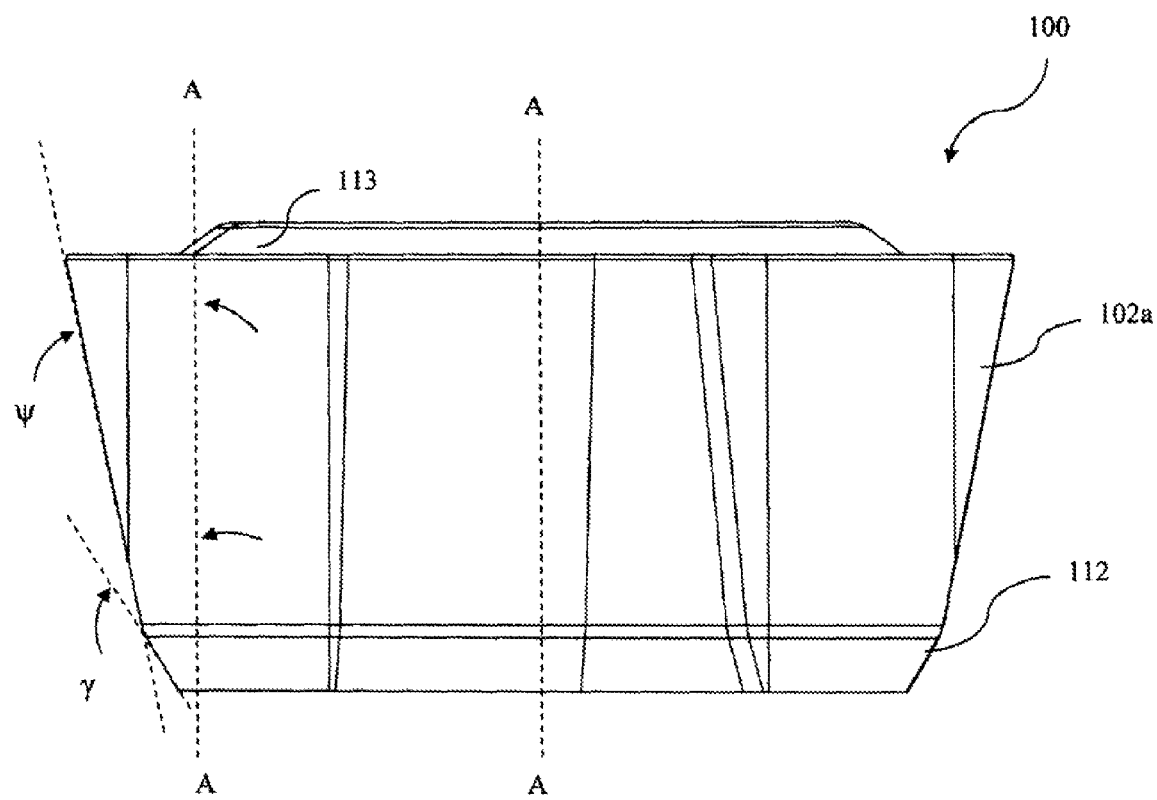
FIG. 4 illustrates a side view of the drill insert of FIG. 1.

FIGS. 3 and 4 are exemplary embodiments illustrating top and front views of the drilling insert (100). The division of cutting edges into a plurality of part edges (104, 106, 108 and 109) is clearly illustrated in the top view of the drilling insert (100). The part edges (104, 106, 108 and 109) with concave curve (107a) and convex curves (105 and 107b) direct the cutting forces to the center of the drill body (502) or axis (504) of drilling, which prevents drifting of the drill from its center. The part edges (104, 106, 108 and 109) are bound to vary in their sizes or lengths as the diameter of the inscribed circle (301) increases to accommodate various sizes of the inserts and hence vary proportionately as the size increases. In one embodiment, the first part edge (104), and the second part edge (106) together form a length ranging from about 30% to about 60% of the total length of the cutting edge (103), and the length of the fourth part edge (109) ranges from about 30% to about 60% of the total length of cutting edge (103).

In one aspect of the present disclosure, the length of the third part edge (108) is in the range of from about 0.5% to about 5% of the diameter of the inscribed circle (301) of the drill insert (100). In an aspect of the present disclosure, the length of the third part edge is 1.5% of the diameter of the inscribed circle (301) of the drill insert (100).

Further, a chamfer (112) is provided at bottom edges of the drill insert (100) towards the bottom portion (201), as shown in FIG. 4, to facilitate the secondary clearance in the insert (100). The angle (γ) of the chamfer (112) depends on thickness of the insert, and the angle (γ) is generally in the range of from about 25° to about 45° with respect to vertical axis (A-A) of the drill insert (100). In an aspect of the present disclosure, the angle of the chamfer is 30° with respect to vertical axis (A-A) of the drill insert (100). The chamfer (112) prevents digging of the pocket (602) (FIG. 6) of the drill body (502) which in-turn eliminates the wear of the pocket (602) when the drill insert (100) is in operation. The chamfer (112) also eliminates rubbing of the surface of the drill hole by the drill insert (100) when the diameter of the drill hole is less than the predetermined limit.

In one embodiment, the drill insert (100) is used in the peripheral pocket (602) of the drill body (502). The corner/nose portions (110) of the cutting edges (103) enlarge the hole which is produced by the insert in the inner pocket (602) of the drill body (502).

FIG. 5 is an exemplary embodiment which illustrates the drill body having the drill insert of the present disclosure in its peripheral pocket (602) and a conventional insert in its center pocket. The drill tool (500) includes shank (501) of predetermined length and a drill body (502) of cylindrical basic shape. The drill body (503) includes a pair of insert pockets, one at its center and the other at its periphery for accommodating the drill inserts. The drill body (502) also includes helical flute (503) on its circumference for vacating the chips generated during the drilling operation. The chips generated during drilling operation are cut by the protrusion (111) of the drill insert (100) and are guided via the helical flute (503) of the drill body (502) for disposing the chips. In one embodiment, an inboard/central insert and an outboard/peripheral insert are positioned in the drill body (502) such that the forces generated during drilling operations are directed to the drill axis (504), which prevents the drill body (502) from drifting from its center.

In one embodiment of the present disclosure, during drilling operation, the inboard insert initially applies moderate cutting forces, and then the outboard/peripheral insert begins to drill the work piece.

FIG. 6 is an exemplary embodiment which illustrates a partially exploded view of drill tool (500) having a drill insert (100) of the present disclosure exploded from peripheral pocket (602) of the drill body (502). When drill insert (100) is positioned in peripheral pocket (602) of the drill body (502), the shape of the peripheral pocket (602) matches with the shape of the drill insert (100). Further, the peripheral pocket (602) includes a threaded hole (not numbered) for fastening the drill insert (100) with the drill body (502) using an insert screw (601). The insert screw (601) includes a series of stepped portions and a threaded portion which passes through the through hole (109) of the drill insert (100) and fastens the same insert in the peripheral pocket (602). Further, the drill body (500) comprises a conventional insert at its center pocket.

The present disclosure provides a quadra angular indexable drill insert in which all four cutting edges are separately used for drilling, i.e. when one edge wears out the subsequent edge can be used for cutting.

The present disclosure provides a quadra angular indexable drill insert which has four identical cutting edges which are divided into a plurality of part edges to direct the forces toward the drill axis (504), which eliminates drifting of the drill from its center.

The present disclosure provides a quadra angular indexable drill insert which has a chamfer in its bottom portion which prevents rubbing of the drilled hole by the insert.

The present disclosure provides a quadra angular indexable drill insert which has a protruded portion on its top surface to break the chip generated during the drilling process.

The present disclosure provides a qudra angular indexable drill insert which has a liner part edge between the concave curve and the convex curve of the drill insert to enable better and smoother chip formation, thereby improving the quality of drilling.

With respect to the use of substantially any plural and/or singular terms herein, those having skill in the art can translate from the plural to the singular and/or from the singular to the plural as is appropriate to the context and/or application. The various singular/plural permutations may be expressly set forth herein for the sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

I claim:

1. A quadrangular indexable drill insert comprising:
a substantially flat top surface and a bottom surface, a side surface adjoining the top surface and bottom surfaces from four sides of the drill insert, the bottom surface is smaller than the top surface to provide positive cutting geometry;
four identical cutting edges of the side surface intersecting the top surface, each cutting edge comprising:
a first part edge extending inwardly from a first end to an opposite second end towards an imaginary circle inscribed about a center axis of the drill insert which passes through the center of the insert from the top surface to the bottom surface;
a second part edge connected to the second end of the first part edge through a convex curve, wherein said second part edge is tangential to the imaginary inscribed circle;
a third part edge joined to the second part edge by a concave curve, the third part edge extending away from a horizontal axis of the drill insert when moving away from the second part edge along the third part edge; and
a fourth part edge extending parallel to the horizontal axis of the drill insert and joined to the third part edge by a convex curve;
a plurality of curved nose portions of predetermined radius, each being disposed at a respective one of four corners of the insert adjoining the fourth part edge of one cutting edge with the first part edge of a succeeding cutting edge;
a through hole disposed about the center of the drill insert and extending between the top surface and the bottom surface of the drill insert for mounting the insert with a drill body; and
a chamfer provided at the bottom edge of the insert.

2. The drill insert as claimed in claim 1, wherein the first part edge is linear and inclined at an angle ranging from about 0.5° to about 5° with respect to the horizontal axis of the drill insert.

3. The drill insert as claimed in claim 1, wherein the second part edge is linear, and is inclined at an angle ranging from about 5° to about 15° with respect to the horizontal axis of the drill insert.

4. The drill insert as claimed in claim 1, wherein the third part edge is linear, and is inclined at an angle ranging from about 20° to about 50° with respect to the horizontal axis of the drill insert.

5. The drill insert as claimed in claim 1, wherein the fourth part edge is linear, and makes an angle of 0° with respect to the horizontal axis of the drill insert.

6. The drill insert as claimed in claim 1, wherein each of the curved nose portions have a radius in the range of from about 0.4 mm to about 1.2 mm.

7. The drill insert as claimed in claim 1, wherein the through hole comprises a mouth portion and a series of stepped portions for accommodating an insert screw.

8. The drill insert as claimed in claim 1, wherein an angle of the chamfer is in the range of from about 0 to about 45 with respect to a vertical axis of the drill insert depending on the thickness of the drill insert.

9. The drill insert as claimed in claim 1, wherein the through hole includes a mouth portion provided near the top surface and wherein the top surface is provided by a protruded portion around the mouth portion.

10. The drill insert as claimed in claim 1, wherein corners of the side surface of the insert form and angle in the range of about 0° to about 11° with respect to a vertical axis of the drill insert.

11. A drill body comprising a quadrangular indexable drill insert as claimed in claim 1 mounted in a peripheral pocket and another insert mounted in a center pocket.

12. A quadrangular indexable drill insert comprising:
- a top surface and a bottom surface, a sider surface adjoining the top and bottom surfaces from four sides of the drill insert,
- four identical cutting edges formed at the intersecting of the top surface and the side surface, each cutting edge comprising:
- a first part edge extending along a horizontal axis of the insert and inwardly toward an imaginary inscribed circle about the center of the insert;
- a second part edge connected to the first part edge through a convex curve, wherein the second part edge is tangential to the imaginary inscribed circle;
- a third part edge joined to the second part edge by a concave curve, the third part edge extending away from the horizontal axis of the drill insert when moving away from the second part edge along the third part edge; and
- a fourth part edge extending parallel to the horizontal axis of the drill insert and joined to the third part edge by a convex curve;
- a plurality of curved nose portions of predetermined radius, each being disposed at a respective one of four corners of the insert and adjoining the fourth part edge of one cutting edge with the first part edge of a succeeding cutting edge; and
- a through hole disposed about the center of the drill insert and extending between the top surface and bottom surface of the drill insert for mounting the insert with a drill body,
- wherein the fourth part edge of one cutting edge and the first cutting edge of a succeeding cutting edge adjoined by a curved nose portion are disposed at an angle less than 90° with respect to each other; and
- wherein the first part edge is linear and inclined at an angle ranging from about 0.5° to about 5° with respect to the horizontal axis of the drill insert, the second part edge is linear, and is inclined at an angle ranging from about 5° to about 15° with respect to the horizontal axis of the drill insert, and the third part edge is linear, and is inclined at an angle ranging from about 20° to about 50° with respect to the horizontal axis of the drill insert.

* * * * *